(12) United States Patent
Yokoohji (10) Patent No.: US 10,216,991 B2
(45) Date of Patent: Feb. 26, 2019

(54) AUTOMATICALLY EDITING PRINT JOB BASED ON STATE OF THE DOCUMENT TO BE PRINTED

(71) Applicant: KONICA MINOLTA LABORATORY U.S.A., INC., San Mateo, CA (US)

(72) Inventor: Ryoichi Yokoohji, San Mateo, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 42 days.

(21) Appl. No.: 15/599,403

(22) Filed: May 18, 2017

(65) Prior Publication Data

US 2017/0286034 A1    Oct. 5, 2017

Related U.S. Application Data

(62) Division of application No. 15/085,814, filed on Mar. 30, 2016, now Pat. No. 9,690,528.

(51) Int. Cl.
*G06K 9/00* (2006.01)
*G06F 3/12* (2006.01)

(52) U.S. Cl.
CPC ....... *G06K 9/00469* (2013.01); *G06F 3/1204* (2013.01); *G06F 3/1254* (2013.01); *G06F 3/1288* (2013.01); *G06F 3/1244* (2013.01)

(58) Field of Classification Search
CPC . G06K 9/00469; G06F 3/1254; G06F 3/1204; G06F 3/1288; G06F 3/1244
See application file for complete search history.

(56) References Cited

U.S. PATENT DOCUMENTS

| | | | |
|---|---|---|---|
| 6,407,820 B1* | 6/2002 | Hansen | G06F 3/1205 358/1.12 |
| 8,136,120 B2* | 3/2012 | Morales | G06F 3/125 358/1.9 |
| 2001/0043346 A1* | 11/2001 | Roztocil | G06F 17/212 358/1.9 |
| 2001/0044868 A1* | 11/2001 | Roztocil | G06F 17/212 358/1.1 |

(Continued)

FOREIGN PATENT DOCUMENTS

JP    2010109420    5/2010

*Primary Examiner* — Ming Y Hon
(74) *Attorney, Agent, or Firm* — Chen Yoshimura LLP (57) ABSTRACT

A method and related apparatus for processing print jobs, which automatically edits both the document to be printed and the job ticket based on a state or content of the document itself, without user intervention, to achieve certain printing effects such as inserting tab sheets of slip sheets, removing pages, inserting annotations, changing finishing settings, etc. In one specific example, the state or content of the document is a specific key phrase or is associated with a specific bookmark. A program is also provided to emulate the result of the automatic editing of the print job and original document. When the print job is processed by a server and the emulation is performed by a client, the server checks whether the client program modules used for the emulation are consistent with the server program modules used for print job processing.

9 Claims, 11 Drawing Sheets

(56) References Cited

U.S. PATENT DOCUMENTS

| | | | |
|---|---|---|---|
| 2002/0161823 A1* | 10/2002 | Casati | G06Q 10/10 |
| | | | 709/202 |
| 2003/0225726 A1* | 12/2003 | Simpson | G06F 17/30011 |
| 2006/0039045 A1 | 2/2006 | Sato et al. | |
| 2006/0209106 A1 | 9/2006 | Kikuch | |
| 2007/0133027 A1 | 6/2007 | Salgado et al. | |
| 2008/0079986 A1 | 4/2008 | Ferlitsch | |
| 2008/0177419 A1 | 7/2008 | Doyle | |
| 2009/0037425 A1* | 2/2009 | Erickson | G06F 9/44505 |
| 2009/0201534 A1 | 8/2009 | Truong | |
| 2009/0276318 A1* | 11/2009 | Broadbent | G01C 21/00 |
| | | | 705/14.64 |
| 2011/0002006 A1* | 1/2011 | Toriumi | G06F 3/1208 |
| | | | 358/1.15 |
| 2012/0212757 A1 | 8/2012 | Gaertner et al. | |
| 2012/0218577 A1* | 8/2012 | Dumitrescu | G06F 3/1205 |
| | | | 358/1.13 |
| 2012/0268763 A1 | 10/2012 | Isobe | |
| 2013/0013662 A1* | 1/2013 | Masuda | G06F 9/5038 |
| | | | 709/201 |
| 2013/0114914 A1 | 5/2013 | Dejean | |
| 2013/0163037 A1* | 6/2013 | Huster | G06F 3/1205 |
| | | | 358/1.15 |
| 2016/0065772 A1 | 3/2016 | Lewis et al. | |

\* cited by examiner

AUTOMATICALLY EDITING PRINT JOB BASED ON STATE OF THE DOCUMENT TO BE PRINTED

BACKGROUND OF THE INVENTION

Field of the Invention

This invention relates to a method of managing print jobs, and in particular, it relates to a method of automatically editing the document and the job ticket of the print job to achieve certain printing effects.

Description of Related Art

In a print shop system, a print job refers to the combination of a document to be printed and a job ticket which contains parameters defining the print and/or finish settings for the print job. The job ticket is a separate file from the document to be printed and is associated with the document and managed by the print shop management system. In practice, there are often situations when tab sheets, slip sheets, etc. (collectively referred to as "separating sheets" in this disclosure) need to be inserted into the printed materials, when the original print job does not contain such sheets. To achieve this with a conventional print job management system, a print shop operator needs to manually edit print settings in the job ticket and/or the document of the print job in order to insert each of the separating sheets. For example, if a customer submits a PDF document that contains multiple articles, and requests that a tab sheet be inserted between adjacent articles, the print shop operator will need to edit the PDF document to add the tab sheets, and edit the job ticket to specify the attributes of the tab sheet. Such an operation is time-consuming. The operator must pay attention in order to prevent improper input when editing print settings in a job ticket. However, operator errors can occur, which can produce unnecessary printed materials and waste time, papers and toner.

SUMMARY

Accordingly, the present invention is directed to a print job editing and management method and related apparatus that substantially obviates one or more of the problems due to limitations and disadvantages of the related art.

An object of the present invention is to automatically edit a document to be printed and the associated job ticket to achieve desired goals.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for processing print jobs implemented on a print server, which includes: (a) obtaining a print job, which includes a document to be printed and an associated job ticket; (b) determining whether each page of the document contains a predefined key phrase or is associated with a specific bookmark; and (c) when a given page is determined to contain the predefined key phrase or is associated with the specific bookmark, automatically editing both the document to be printed and the job ticket based on content of the key phrase or the bookmark.

In one embodiment, when a given page is determined to contain the predefined key phrase or is associated with the specific bookmark that indicates insertion of a separating sheet, the method automatically adds a new page to the document at a position corresponding to the given page and edits the job ticket to insert a separating sheet to the print job at the position corresponding to the given page.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a system and method to automatically edit a job ticket (i.e. print settings) and an original document, based on a state or content of the document itself, without user intervention. In one specific example, by checking whether each page includes a specific key phrase or is associated with a specific bookmark, the document and the job ticket are automatically edited so that a tab sheet or slip sheet is inserted at a corresponding position. A program is also provided to emulate the result of the editing the print job and original document.

Figure 1:
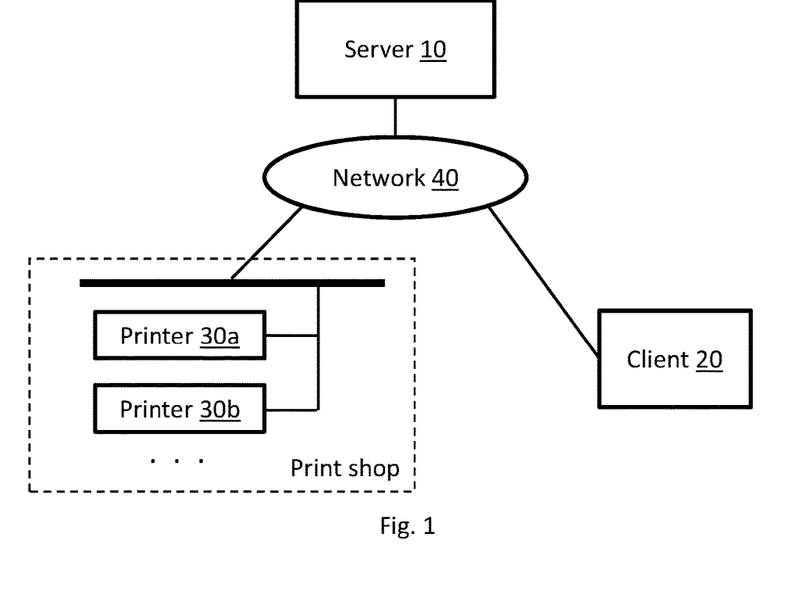
FIG. 1 is a schematic block diagram showing a system in which embodiments of the present invention may be implemented.
Figure 2:
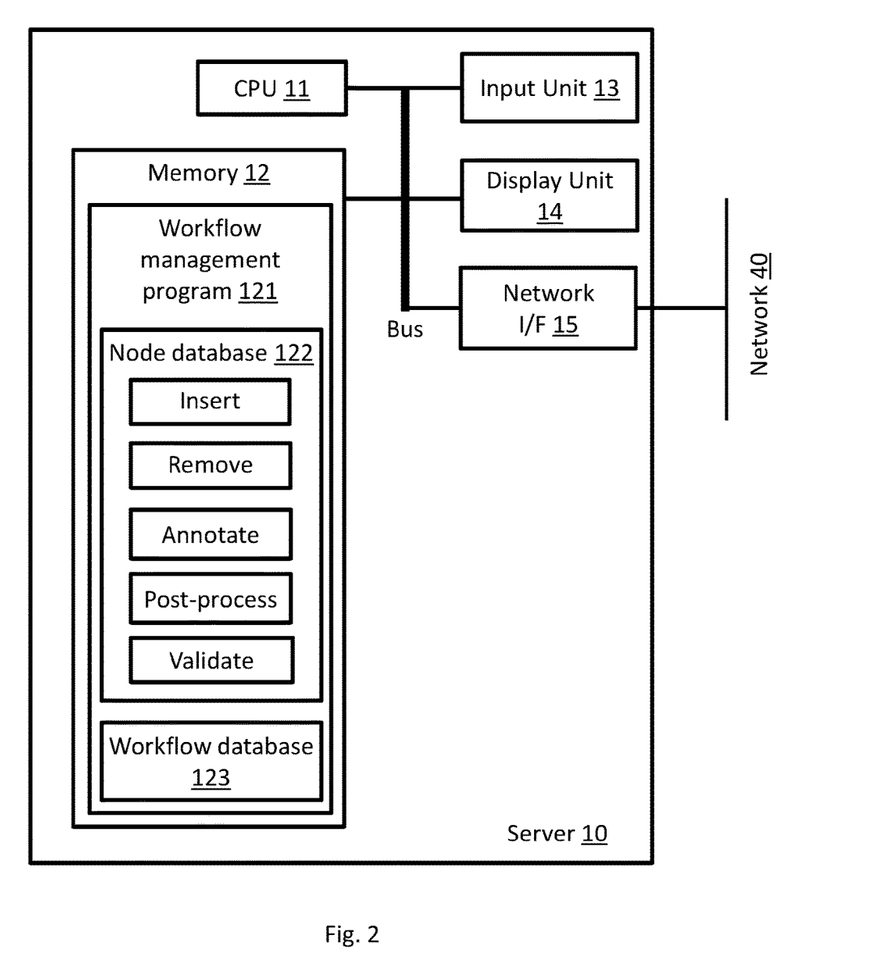
FIG. 2 schematically illustrates a server of the system shown in FIG. 1.
Figure 3:
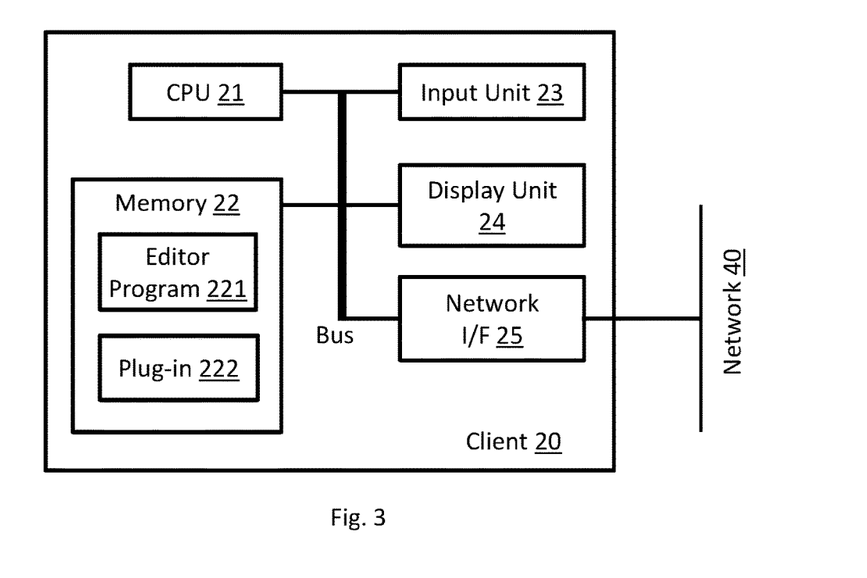
FIG. 3 schematically illustrates a client of the system shown in FIG. 1.

FIG. 1 is a schematic block diagram showing a system in which embodiments of the present invention may be implemented. The system includes a print server 10, a client 20 and multiple printers 30a, 30b etc. of a print shop, connected to each other by a network 40 (e.g., the internet). As shown in FIG. 2, the server 10 may be a desktop computer maintained by the print shop, and includes a CPU 11, memory 12, input unit 13, display unit 14, and network interface unit 15. The memory 12 stores a workflow management program 121 which may be executed by the CPU 11. As shown in FIG. 3, the client 20 may be a computer of a customer of the print shop, and includes a CPU 21, memory 22, input unit 23, display unit 24, and network interface unit 25. The memory 22 stores an editor program 221 (e.g., Adobe Acrobat) and a plug-in program 222 for the editor program. The plug-in program may be provided from the server 10. The customer can prepare a document to be submitted to the print shop by using the editor program 221 and the plug-in program.

As shown in FIG. 2, the workflow management program 121 store in the server 10 includes a node database 122 and a workflow database 123. Each node in the node database 122 is a program modules that performs defined functions, and multiple nodes in a sequence can form a workflow. The functions of the nodes are as follows.

Input node: This node monitors a predetermined file folder, and forwards a document to the next node in response to detecting the fact that the document has been input to the predetermined folder.

Insert node: This node checks whether each page of the document contains a specific keyword, clause and/or sentence (collectively referred to as predefined "key phrase" in this disclosure), or is associated with a specific bookmark. When a given page contains predefined key phrase or is associated with the specific bookmark, the node automatically adds a new page to the document and edits the associated job ticket, so that a separating sheet (tab sheet, slip sheet, etc.) is inserted at the corresponding position.

Remove node: This node checks whether each page of the document contains a predefined key phrase or is associated with a specific bookmark. When a given page contains the predefined key phrase or is associated with the specific bookmark, the node automatically deletes the page from the document.

Annotate node: This node checks whether each page of the document contains a predefined key phrase or is associated with a specific bookmark. When a given page contains the predefined key phrase or is associated with the specific bookmark, the node automatically adds a watermark, a logo mark or other annotations on the page.

Finishing (post-processing) node: This node checks whether each page of the document contains a predefined key phrase or is associated with a specific bookmark. When a given page contains the predefined key phrase or is associated with the specific bookmark, the node edits the associated job ticket, so that finishing operation (e.g. staple, punch or binding) is performed for the page.

Validate node: This node checks whether a plug-in which was used when editing the document by the client is consistent with a workflow by which the document is being processed. When the plug-in is not consistent with the workflow, the node notifies the fact to an operator of the print shop.

One type of predefined key phrase may be words naturally occurring in the original text of the document to be printed, such as "chapter", "appendix", etc. If necessary, the document to be printed may be processed by OCR (optical character recognition) to extract searchable text. Another type of key phrase may be key phrases inserted into the document to be printed ay its editor, such as the term "tab sheet". In other words, the editor of the document can insert words such as "tab sheet" in the document to indicate that a tab sheet is to be inserted when the document is printed.

Workflows may be created on the server, each workflow being formed of plural nodes in a defined sequence, with various setting parameters for each node. The setting parameters may include, for example, the predefined key phrase or specific bookmarks that are checked by the node. For the insert node, the setting parameters may include paper attributes such as paper type and color for the tab or slip sheets, the position and size of the tabs of the tab sheets (for examine, the bank count of the tabs such as "six tabs evenly distributed along the side"), etc. For the annotate node, the setting parameters may include the location of the annotation to be inserted on the pages, etc. For the finishing node, the setting parameters may include finishing type such as stapling with a number staples, punching with a number of holes, and folding with its type like z-fold, half letter fold, etc.

The workflow management program 121 may implement a graphical user interface (GUI) that allows an operator (preferably an administrative operator of the print shop system) to build a workflow by dragging and dropping icons representing nodes and inputting the setting parameters.

The workflow database 123 stores information of each workflow that has been created. The workflow information for each workflow includes node IDs of the nodes, the order of the nodes, and the setting parameters for each node. The workflow management program 121 manages the generated workflows and executes them. Workflows can be executed on print jobs to process the documents and their associated job tickets before printing. A workflow, after it is defined, can be re-used to process different print jobs.

Note that constructing workflows using sequences of nodes is a known technique in existing print shop systems. However, some specific nodes described above, such as insert, remove, annotate, finishing, and validate, are developed by inventors of the present invention.

The workflow information is also used by the workflow management program 121 or by the client 20 (e.g. the plug-in program 222) to emulate functions of nodes included in the workflow, which allows the user (customer or print shop operator) to preview the effect of the workflow on the document. To emulate the effect created by the various nodes, the plug-in program 222 on the client contains program modules that correspond to the nodes implemented on the server to emulate the effect of these nodes. To enable the plug-in program to emulate a workflow, the server creates plug-in information which corresponds to the workflow information and transmits it to the client, so that the plug-in program can use it to perform the emulation on documents.

Figure 4:
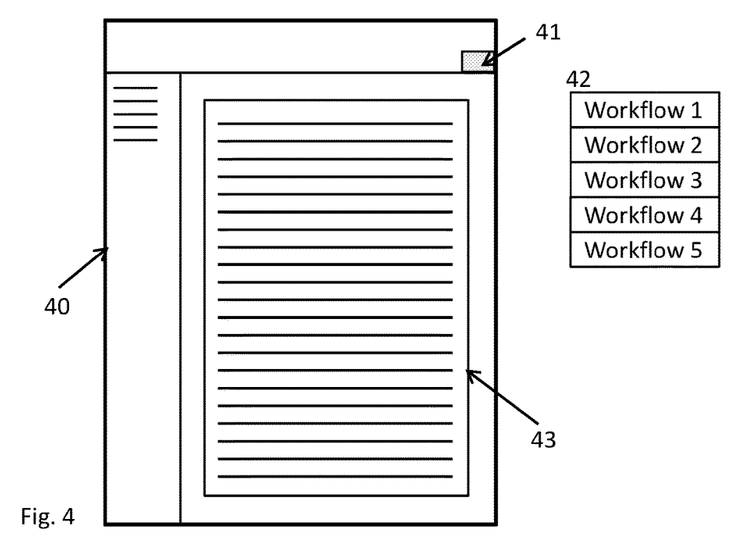
FIGS. 4-7 schematically illustrate a display screen generated by the client according to an embodiment of the present invention.

The function of the plug-in program 222 on the client 20 is described with reference to the examples shown in FIGS. 4-7. FIG. 4 illustrates a display window 40 of the editor program 221 which the user at the client computer (the customer) is using to edit the document to be submitted for printing. A page of the document is displayed in the area 43. The editor program 221 (or alternatively, the plug-in program 222, if the editor program itself does not have an editing function) also enables the user to edit the document, such as to add a keyword (e.g. "tab sheet") to a page or add a bookmark, so that the keywords or bookmarks can later be detected and processed by the workflow program.

The window 40 displays an icon 41, which can be clicked to activate the plug-in program 222. When the user clicks on the plug-in icon 41, a menu window 42 for selecting a workflow is opened. In the menu window 42, a number of workflows managed by the server are listed. When the user selects a workflow to which the document will be input, the client receives corresponding plug-in information from the server. Note that regardless of which page of the document is being displayed, the workflow selection is for the entire document.

The plug-in program changes display screen of each page by emulating functions of the workflow based on the plug-in information (including the setting parameters for each node) and the state of the page, i.e., whether a specific predefined key phrase is contained in the page or a specific bookmark is associated with the page.

Figure 5:
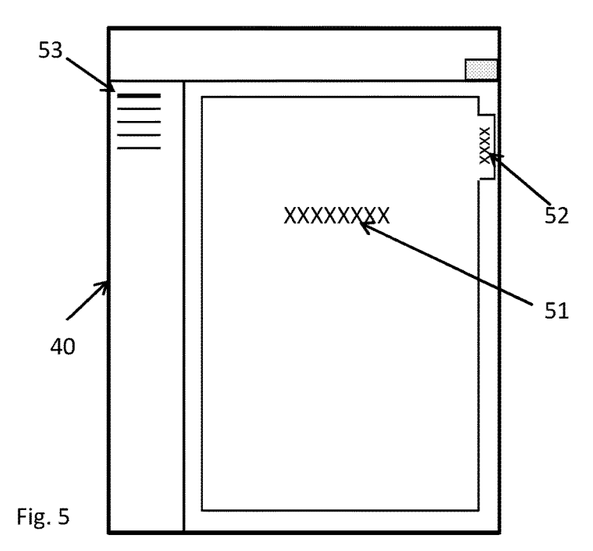

FIG. 5 is an example of a preview window 40 showing an emulation of a tab sheet (an added page) that will be inserted by the insert node. The content of the window dynamically changes by modification of the document; for example, when the customer adds a bookmark for a tab sheet on a page, the plug-in program emulates the function of the insert node which detects such a bookmark, and displays an emulated tab sheet accordingly. When the user deletes this bookmark, the emulated tab sheet disappears accordingly. The contents of the bookmark may be reflected on the emulated tab sheet page as indicated by added text 51 and 52. In addition, the display window 40 also displays a list of bookmarks 53 in the document, and the bookmark that caused the current tab sheet to be added may be highlighted.

Figure 6:
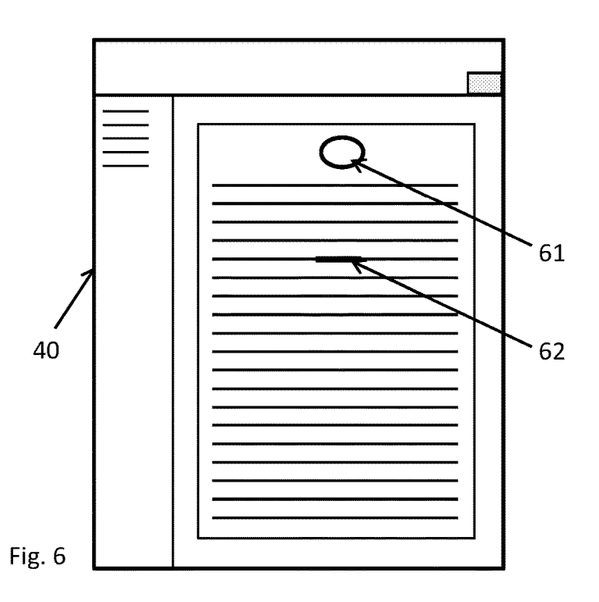

FIG. 6 is an example of a preview window 40 showing an emulation of a page of the document that will be modified by the annotate node. Annotation 61 is added on the page. The keyword on the page that caused the annotation to be added may be highlighted as indicated at 62.

Figure 7:
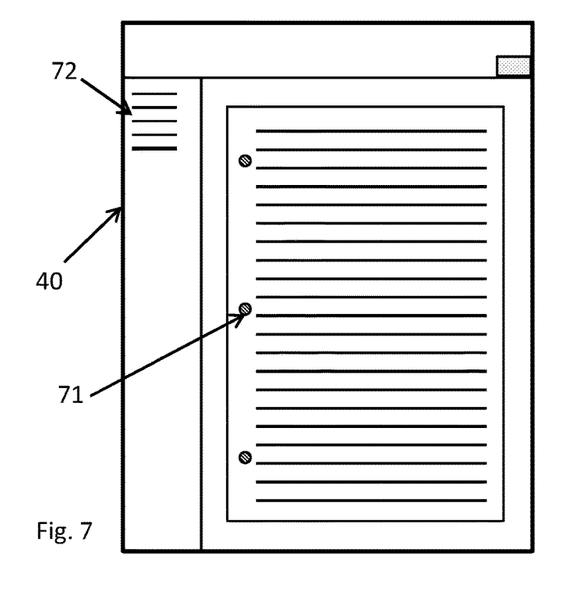

FIG. 7 is an example of a preview window 40 showing an emulation of a page for which print setting will be modified by the finishing node. In this example, the finishing setting is three-hole punch 71 in the left margin. The display window 40 also displays a list of bookmarks 72 in the document, and the bookmark that caused the changes in the print setting may be highlighted.

Figure 8:
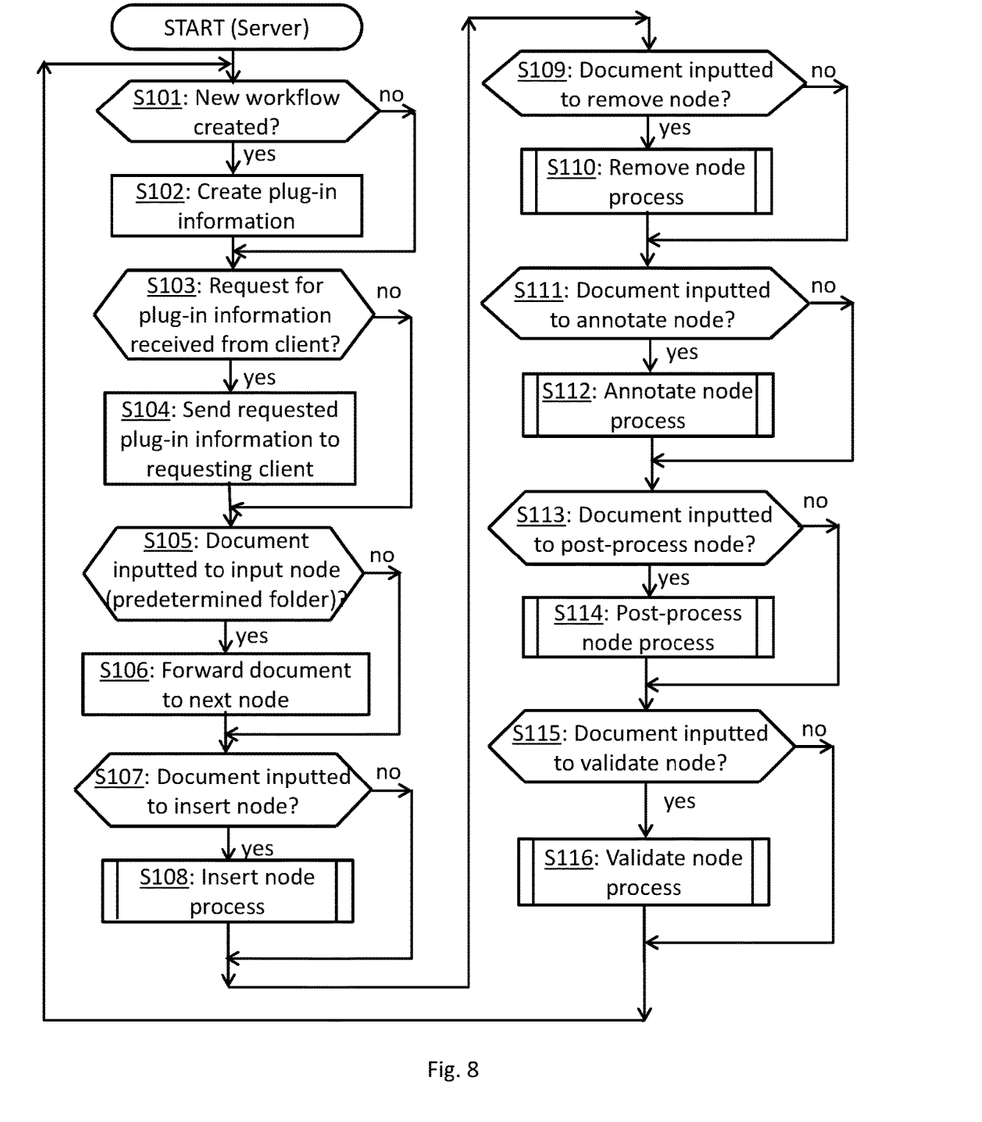
FIGS. 8-13 schematically illustrate a process executed by the server to edit a document and associated job ticket using a workflow according to an embodiment of the present invention.

The process executed by the server is described in detail below with reference to FIGS. 8-13. FIG. 8 shows the overall process flow, and FIGS. 9-12 show the process of the various nodes.

The server creates a new workflow in response to commands from the operator of the print shop system, and stores workflow information inputted by the operator in the workflow database (this step is not shown in FIG. 8). After creating a workflow ("yes" in step S101), the server creates corresponding plug-in information and stores it in a plug-in information database (step S102). The plug-in information is information that will be used by the plug-in program of the client to emulate the effect of the newly created workflow, and contains setting parameters corresponding to those in the workflow, as well as node IDs and the order of the nodes.

In response to a request from the client for updated plug-in information (step S103), the server sends the requested plug-in information to the requesting client (step S104). The manner of sending the plug-in information will be described in more detail later.

In steps S105-S116, the server executes a corresponding process, e.g. insert, remove, annotate, post-process, and validate, when a document is inputted to each node included in a workflow.

After the print job (the document and the job ticket) is processed using the workflow, the print job can be submitted to a printing device and/or finishing device to print the document according to the settings specified in the job ticket.

Figure 9:
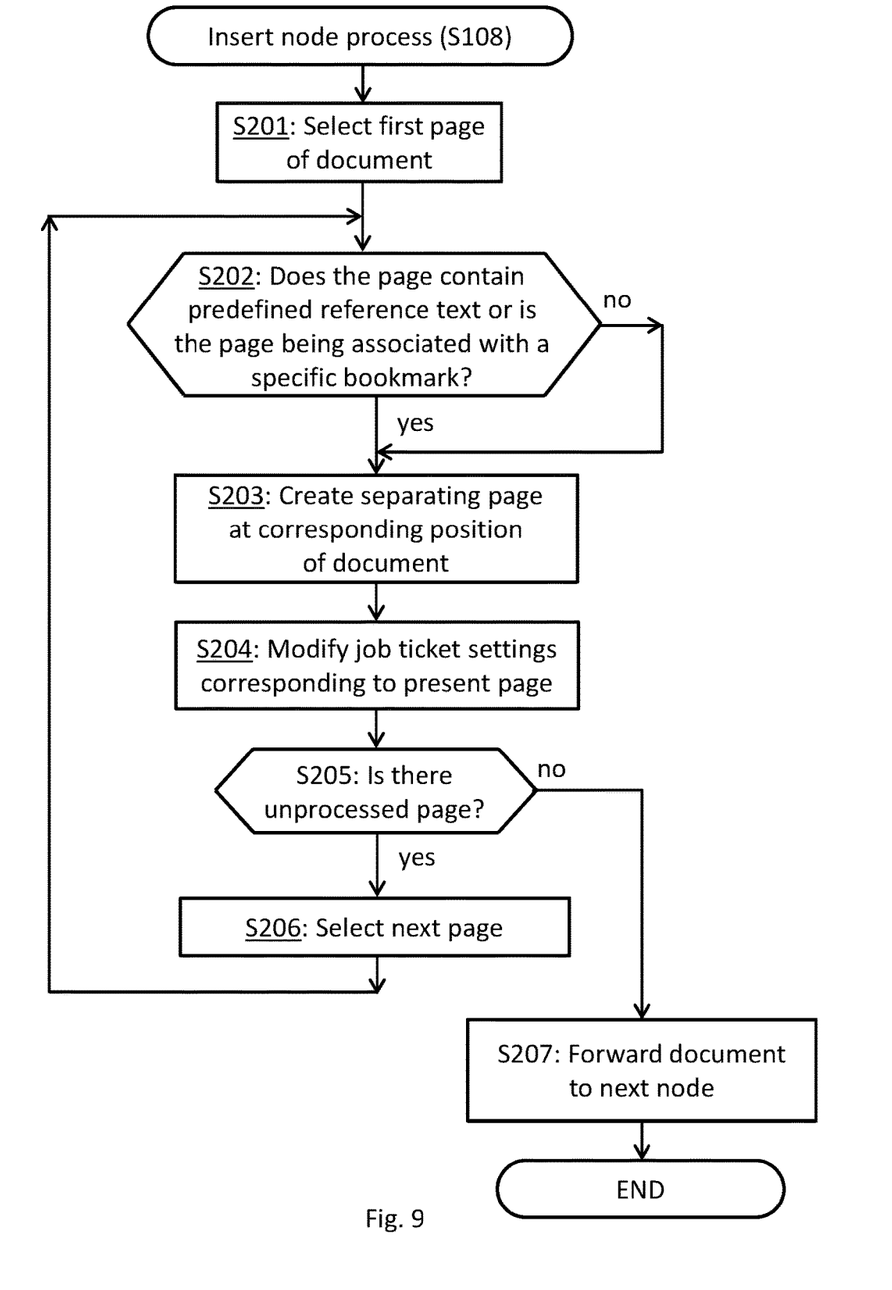

The process of the insert node is shown in FIG. 9. The server selects the first page of the input document (step S201), and checks whether the page contains predefined key phrase or is associated with a specific bookmark (step S202). When the page contains predefined key phrase or is associated with a specific bookmark ("yes" at step S202), the server creates a separating page at the corresponding position of the document (step S203), and also edits the job ticket associated with the document (step S204) so that a separating sheet can be inserted at the corresponding position.

The separating page generated in step S203 may contain text or other labels according to the settings in the workflow information. The text or other label contained in the separating sheet may also dependent on the content of the document itself; for example, the tab may contain a chapter number which is extracted from the content of the document or the bookmark.

In step S204, the modification of the job ticket includes, for example, setting the paper attributes (paper name, paper type, paper color, paper weight, paper size, etc.) for the separating page, tab settings (e.g. bank count), etc.

The process then determines whether there is an unprocessed page and if there is ("yes" at step S205), the server select next page (step S206) and then returns to step S202. If there is no unprocessed page ("no" at step S205), the server forwards the document to the next node (S207).

Figure 10:
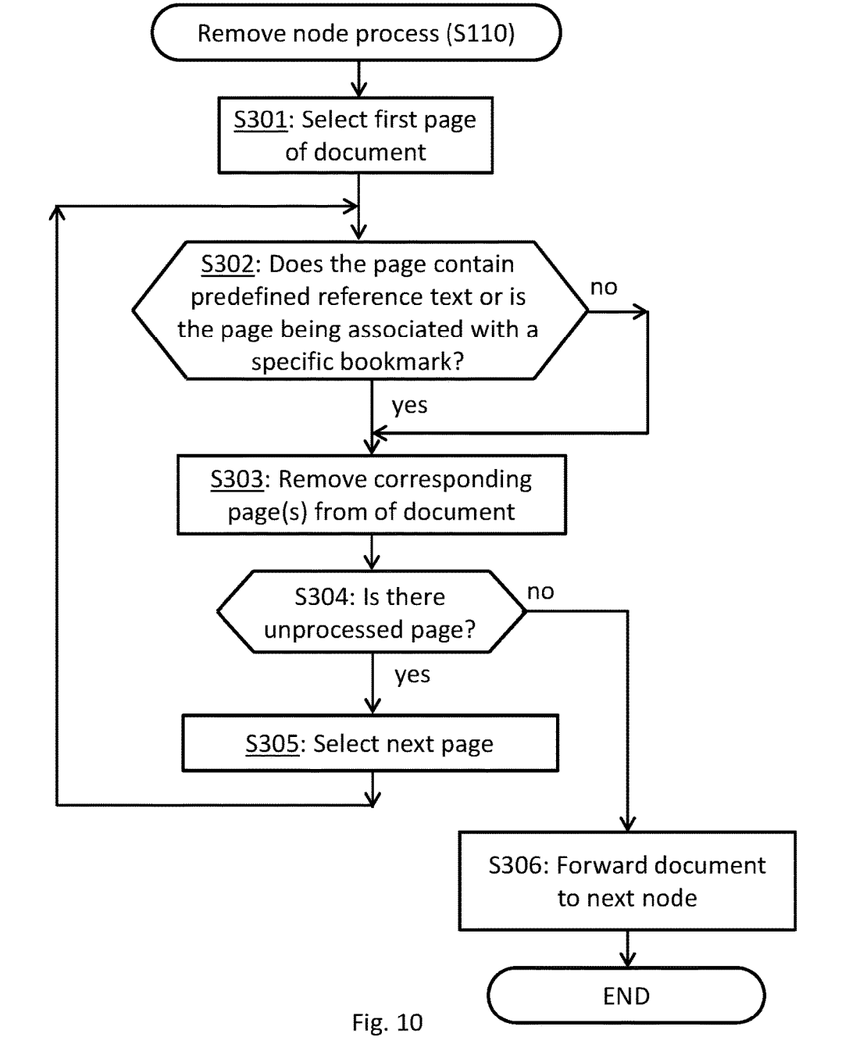
Figure 11:
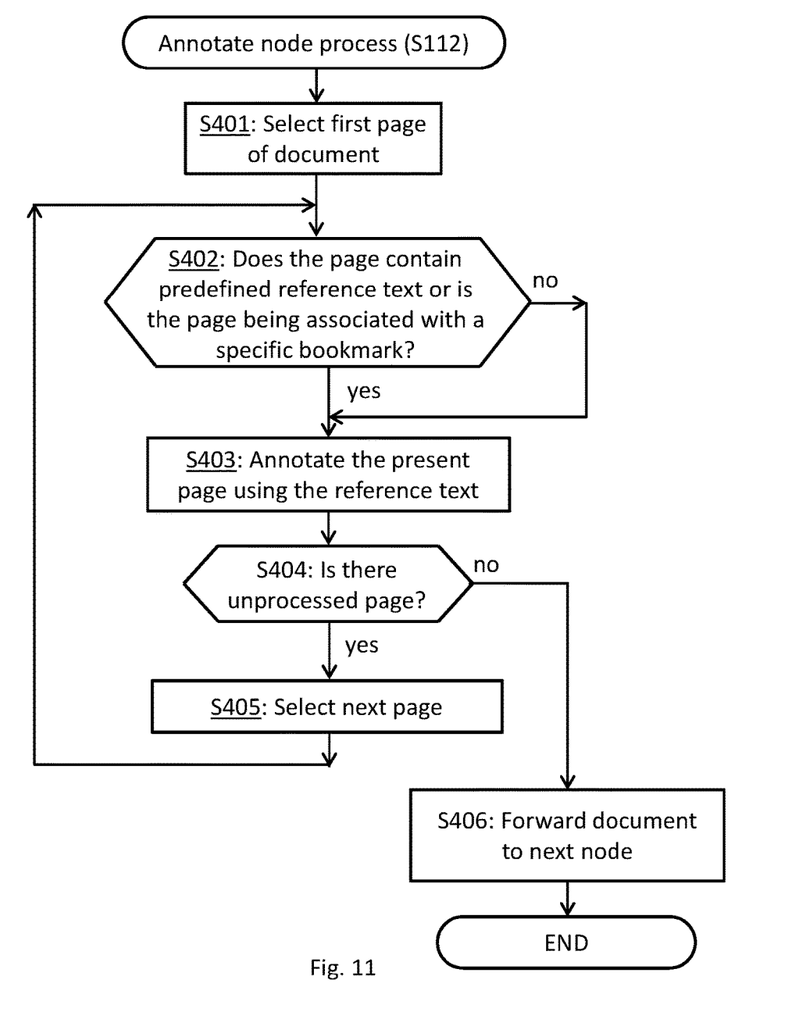
Figure 12:
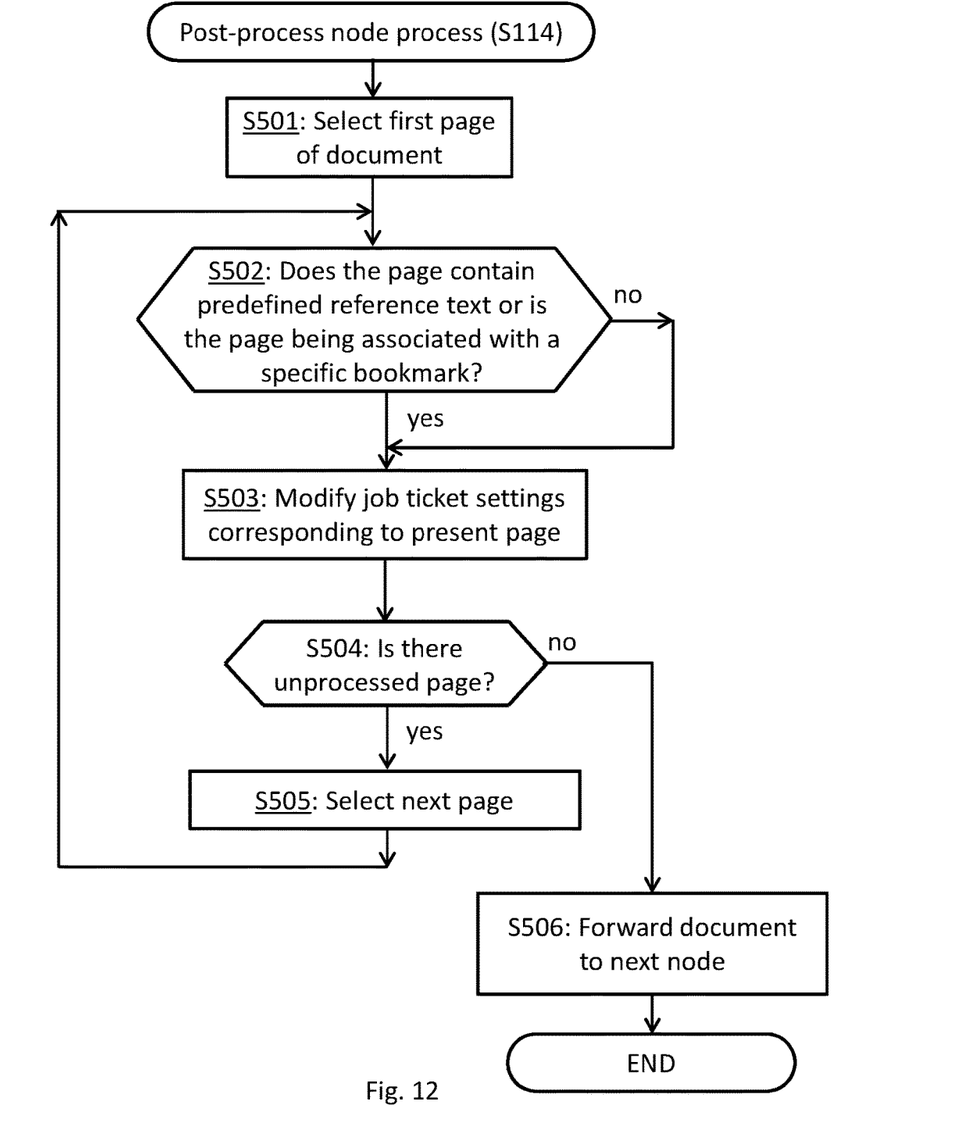

The processes of the remove, annotate and finishing nodes, illustrated in FIGS. 10-12, are generally similar to the process of the inert node shown in FIG. 9, except that steps S203 and S204 in FIG. 9 are replaced by step S303, remove corresponding page(s) from of document, step S403, annotate the present page using the key phrase, and step S503, modify setting parameters of job ticket corresponding to the present page, respectively.

In steps S203, S303 and S403, the document itself is modified. In steps S204 and S503, the job ticket is modified.

Figure 13:
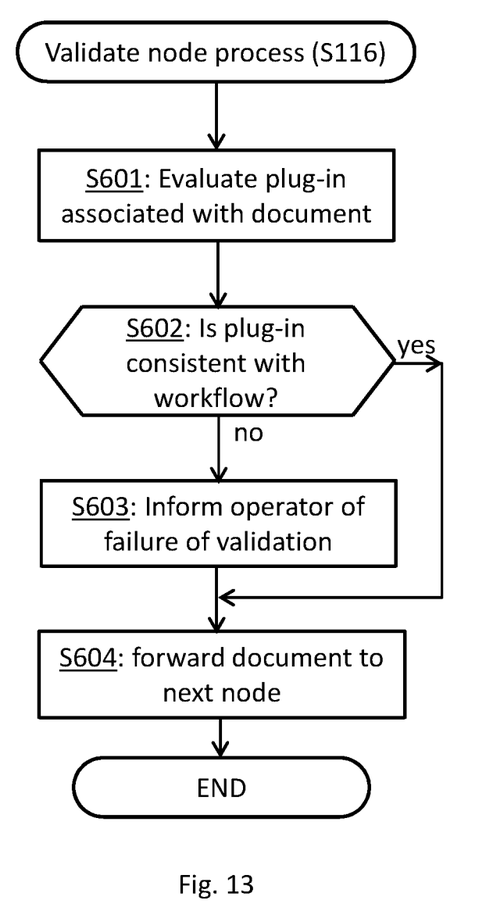

The process of the validate node is shown in FIG. 13. The server evaluates what plug-in program was used when the document was edited (step S601). This is done by reviewing the metadata of the document, as the plug-in writes descriptive information about itself into the metadata of the document. The server then checks whether the plug-in used to edit the document is consistent with the present workflow (step S602). If the plug-in used for the document is not consistent with the present workflow, the server notifies the fact to an operator of the print shop (S603).

Figure 14:
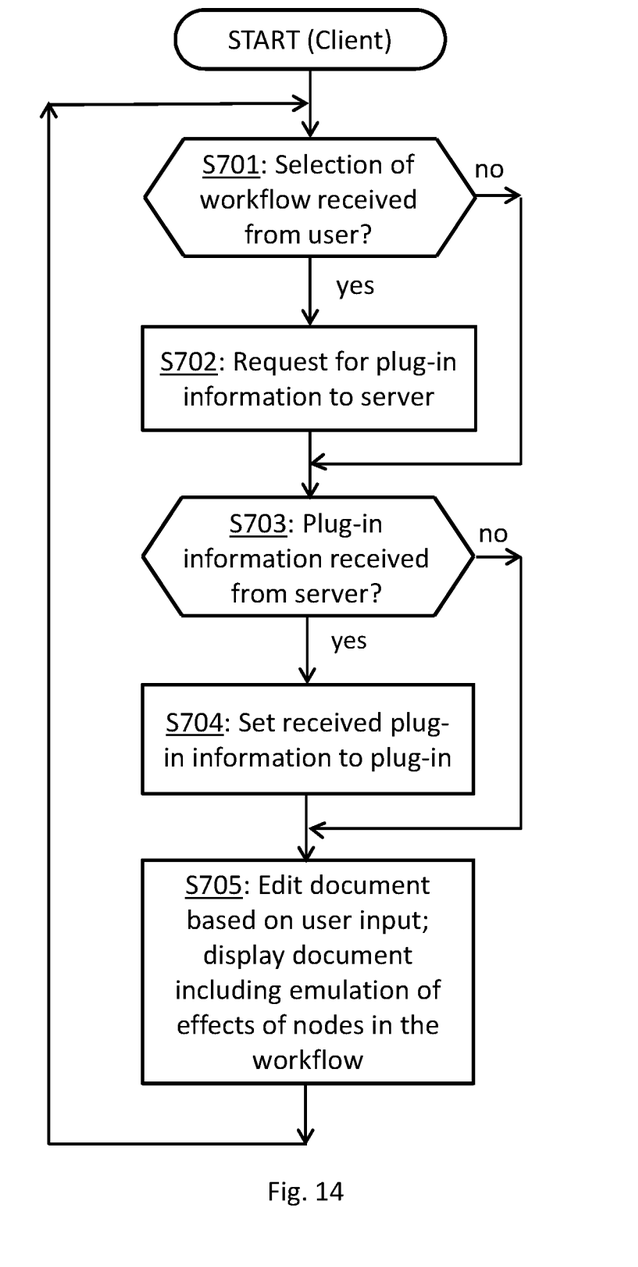
FIG. 14 schematically illustrates a process executed by the client to emulate the printing result for a document according to an embodiment of the present invention.

The process executed by the plug-in program 222 of the client when editing a document is described below with reference to FIG. 14. When the client received user selection of a workflow ("yes" in step S701), the client send a request to the server to request plug-in information corresponding to the workflow that user selected (step S702). When the client received the plug-in information from the server ("yes" in step S703), the client updates the plug-in program or locally stored plug-in information based on the received information (S704). The client then executes the plug-in program based on the plug-in information corresponding to the selected workflow and displays the resulting pages on the screen (step S705). This step also includes editing the document based on the user input (if any), such as adding the predefined key phrase to certain pages, adding specific bookmarks, etc., so that the key phrase and bookmarks can be detected by the nodes when the server processes the print job using the workflow.

In step S705, the plug-in program emulates the result of the various nodes in the selected workflow, for example, by displaying a tab sheet (see FIG. 5), annotation on a page (see FIG. 6), finishing effects (see FIG. 7), etc. Note that for purposes of displaying the emulated effects of the workflow, the plug-in program does not actually modify the document or the job ticket; it only emulates the effect of the workflow for the user to preview.

The purpose of steps S702-S704 is to ensure that the plug-in information used by the plug-in program to perform emulation is consistent with the selected workflow on the server. In some cases, the client already has the up-to-date plug-in information corresponding to the selected workflow, so in step S703 the client does not receive updated plug-in information. This can be accomplished, for example, by the server keeping a timestamp for the plug-in information that has already been sent to the client and determining whether updated plug-in information has been generated since that time. When updated plug-in information is to be sent to the client, it may be accomplished in a variety of ways.

In a first method, the plug-in program is already installed on the client, and it contains various program modules that emulate the effect of the corresponding nodes. When a new workflow is created, the server also creates plug-in information corresponding to the workflow, and sends the plug-in information to the client. In a second method, the server creates plug-in information corresponding to the selected workflow, embeds the plug-in information in the plug-in program, and then sends the plug-in program to the client which will replace any existing plug-in program on the client. In the third method, the server creates a plug-in program which contains only modules corresponding to nodes contained in the selected workflow, as well as the corresponding plug-in information, and sends the plug-in program to the client, and the client uses this plug-in to emulate the specific workflow that the user selected.

Another workflow example operates on a print job that includes plural documents associated with single job ticket, to create the result of inserting a separating sheet between different printed documents. In this workflow, the input node receives a set of plural documents as input of a single job, and the insert node inserts a separating sheet at the end of each document (except for the last document).

It will be apparent to those skilled in the art that various modification and variations can be made in the print job editing method and related apparatus of the present invention without departing from the spirit or scope of the invention. Thus, it is intended that the present invention cover modifications and variations that come within the scope of the appended claims and their equivalents.

What is claimed is:

1. A method for processing print jobs implemented on a print system, the system comprising a server which executes a workflow and a client which executes an editor program, the method comprising:

by the client,
(a) receiving a user selection of a workflow to be executed by the server for a document the selected workflow including one or more editing processes for automatically editing the document or its associated print job ticket based on setting parameters of the selected workflow and either predefined key phrases contained in pages of the document or bookmarks associated with pages of the document or both;
(b) editing the document by the editor program, including displaying the document and emulating effects of the selected workflow using a plug-in program corresponding to the selected workflow, wherein the plug-in program is configured to automatically change a display effect of the document by emulating effects of the selected workflow based on setting parameters of the selected workflow and either predefined key phrases contained in the document or bookmarks associated with the document or both;
(c) outputting the edited document, the edited document having associated data that specifies the plug-in program used for emulation in step (b);

by the server,
(d) obtaining a print job to be input to a present workflow, the print job including the edited document and an associated job ticket;
(e) based on the associated data of the edited document, determining whether the plug-in program used for emulation when the document was edited by the editor program is consistent with the present workflow;
(f) when it is determined that the plug-in program used for emulation when the document was edited by the editor program is not consistent with the present workflow, notifying the determination result to a user; and
(g) when it is determined that the plug-in program used for emulation when the document was edited by the editor program is consistent with the present workflow, executing the present workflow on the document to automatically edit the document or its associated print job ticket based on setting parameters of the present workflow and either predefined key phrases contained in pages of the document or bookmarks associated with pages of the document or both, and submitting the automatically edited print job to a printing device to be printed.

2. The method of claim 1, wherein emulating the effect of the selected workflow in step (b) includes at least one of:
(b1) detecting a page that contains a predefined key phrase or is associated with a specific bookmark that indicates insertion of a separating sheet, and automatically adding a new page to an emulated display of the document at a position corresponding to the detected page,
(b2) detecting a page that contains a predefined key phrase or is associated with a specific bookmark that indicates removal, and automatically removing the detected page from an emulated display of the document, and
(b3) detecting a page that contains a predefined key phrase or is associated with a specific bookmark that indicates annotation, and automatically adding an annotation to an emulated display of the detected page based on content of the key phrase or the bookmark.

3. The method of claim 1, further comprising:
by the client, after step (a) and before step (b),
transmitting a request to the server to request plug-in information corresponding to the workflow selected by the user;
receiving the plug-in information from the server; and
updating a plug-in program or plug-in information stored on the client based on the received plug-in information.

4. The method of claim 1, wherein steps (e) and (f) are executed by a node included in the present workflow.

5. A method for processing print jobs implemented on a client which executes an editor program, the client being connectable to a server which executes a workflow, the method comprising:
(a) receiving a user selection of a workflow to be executed by the server for a document the selected workflow including one or more editing processes for automatically editing the document or its associated print job ticket based on setting parameters of the selected workflow and either predefined key phrases contained in pages of the document or bookmarks associated with pages of the document or both;

(b) editing the document by the editor program, including displaying the document and emulating effects of the selected workflow using a plug-in program corresponding to the selected workflow, wherein the plug-in program is configured to automatically change a display effect of the document by emulating effects of the selected workflow based on setting parameters of the selected workflow and either predefined key phrases contained in the document or bookmarks associated with the document or both; and (c) outputting the edited document, the edited document having associated data that specifies the plug-in program used for emulation in step (b).

6. The method of claim 5, wherein emulating effects of the selected workflow in step (b) includes at least one of:

(b1) detecting a page that contains a predefined key phrase or is associated with a specific bookmark that indicates insertion of a separating sheet, and automatically adding a new page to an emulated display of the document at a position corresponding to the detected page, (b2) detecting a page that contains a predefined key phrase or is associated with a specific bookmark that indicates removal, and automatically removing the detected page from an emulated display of the document, and (b3) detecting a page that contains a predefined key phrase or is associated with a specific bookmark that indicates annotation, and automatically adding an annotation to an emulated display of the detected page based on content of the key phrase or the bookmark.

7. The method of claim 5, further comprising:
by the client, after step (a) and before step (b),
transmitting a request to the server to request plug-in information corresponding to the workflow selected by the user;
receiving the plug-in information from the server; and
updating a plug-in program or plug-in information stored on the client based on the received plug-in information.

8. A method for processing print jobs implemented on a server which executes a workflow comprising:

(a) obtaining a print job to be input to a present workflow, the present workflow including one or more editing processes for automatically editing the document or its associated print job ticket based on setting parameters of the present workflow and either predefined key phrases contained in pages of the document or bookmarks associated with pages of the document or both, the print job including a document and an associated job ticket, the document having associated data that specifies a plug-in program that was used for emulation when the document was edited, wherein the plug-in program is configured to automatically change a display effect of the document by emulating effects of a selected workflow based on setting parameters of the selected workflow and either predefined key phrases contained in the document or bookmarks associated with the document or both;

(b) based on the associated data of the edited document, determining whether the plug-in program used for emulation when the document was edited is consistent with the present workflow;

(c) when it is determined that the plug-in program used for emulation when the document was edited is not consistent with the present workflow, notifying the determination result to a user; and (d) when it is determined that the plug-in program used for emulation when the document was edited is consistent with the present workflow, executing the present workflow on the document to automatically edit the document or its associated print job ticket based on setting parameters of the present workflow and either predefined key phrases contained in pages of the document or bookmarks associated with pages of the document or both, and submitting the edited print job to a printing device to be printed.

9. The method of claim 8, wherein steps (b) and (c) are executed by a node included in the present workflow.

* * * * *